(12) United States Patent
Gu et al.

(10) Patent No.: US 7,403,488 B2
(45) Date of Patent: Jul. 22, 2008

(54) SCHEDULING PACKET FLOWS IN MULTI-RATE WIRELESS LOCAL AREA NETWORKS

(75) Inventors: Daqing Gu, Burlington, MA (US); Jinyun Zhang, Cambridge, MA (US); Yuan Yuan, Cambridge, MA (US)

(73) Assignee: Mitsubishi Electric Research Labortories, Inc., Cambridge, MA (US)

( * ) Notice: Subject to any disclaimer, the term of this patent is extended or adjusted under 35 U.S.C. 154(b) by 927 days.

(21) Appl. No.: 10/780,357

(22) Filed: Feb. 17, 2004

(65) Prior Publication Data
US 2005/0180444 A1 Aug. 18, 2005

(51) Int. Cl.
*H04L 1/00* (2006.01)
(52) U.S. Cl. .......... 370/252; 370/328; 370/330; 370/338; 370/230; 455/436; 455/437; 455/440; 455/443
(58) Field of Classification Search .......... 370/252, 370/338, 328, 329, 330, 337, 238, 230, 237; 455/436–443
See application file for complete search history.

(56) References Cited

U.S. PATENT DOCUMENTS

| | | | | |
|---|---|---|---|---|
| 5,572,528 A | * | 11/1996 | Shuen | 370/402 |
| 5,852,405 A | * | 12/1998 | Yoneda et al. | 340/825.02 |
| 6,317,416 B1 | * | 11/2001 | Giroux et al. | 370/232 |
| 6,728,257 B1 | * | 4/2004 | Bharghavan et al. | 370/458 |
| 6,791,997 B2 | * | 9/2004 | Beyer et al. | 370/447 |
| 7,046,650 B2 | * | 5/2006 | Sherman | 370/338 |
| 7,136,361 B2 | * | 11/2006 | Benveniste | 370/310.2 |
| 7,248,570 B2 | * | 7/2007 | Bahl et al. | 370/329 |
| 2003/0123414 A1 | * | 7/2003 | Tong et al. | 370/337 |
| 2004/0064467 A1 | * | 4/2004 | Kola et al. | 707/100 |
| 2004/0090924 A1 | * | 5/2004 | Giaimo et al. | 370/252 |
| 2005/0018624 A1 | * | 1/2005 | Meier et al. | 370/318 |

OTHER PUBLICATIONS

G. Holland, N. Vaidya, and P. Bahl. A rate-adaptive MAC protocol for multi-hop wireless networks. In Proceedings of ACM MOBICOM'01, Rome, Italy, 2001.

T. Ng, I. Stoica, and H. Zhang. Packet fair queuing algorithms for wireless networks with location-dependent errors. In Proceedings of IEEE INFOCOM'98, San Francisco, CA, May 1998.

(Continued)

*Primary Examiner*—Edan Ohgad
*Assistant Examiner*—Andrew C. Lee
(74) *Attorney, Agent, or Firm*—Drirk Brinkman; Clifton D. Mueller; Gene V. Vinokue

(57) ABSTRACT

A system and method schedule series of packets for transmission between terminals in a single wireless channel of a packet-switched local area network. The local area network can operate in an ad hoc mode or in infrastructure mode. A transmission rate is assigned to each of the terminals. The terminals can be mobile. Different terminals can be assigned different transmission rates, depending on a quality of the channel. That is, terminals transmitting via an error-free channel are assigned a higher transmission rate than terminals transmitting via an error-prone channel. Then, the series of packets are scheduled for transmission between the terminals such that each terminal receives a substantially equal amount of transmission time over an extended period of time.

19 Claims, 7 Drawing Sheets

OTHER PUBLICATIONS

P. Goyal, P., Vin, H. M., and Cheng H. Start-time Fair Queuing: A Scheduling Algorithm for Integrated Services Packet Switching Networks. IEEE/ACM Transactions on Networking, vol. 5, No. 5, pp. 690-704, Oct. 1997.

A. Demers, S. Keshav, and S. Shenker. Analysis and simulation of a fair queueing algorithm. In ACM SIGCOMM, pp. 1-12, Sep. 1989.

A. Parekh. A Generalized Processor Sharing Approach to Flow Control in Integrated Services Networks. PhD Thesis, MIT Laboratory for Information and Decision Systems, Technical Report LIDS-TR-2089, 1992.

* cited by examiner

| Traffic Sources | Delay$^{avg}$ | | Delay$^{max}$ | | Delay$^{dev}$ | | Buffer$^{avg}$ | |
|---|---|---|---|---|---|---|---|---|
| | WFS | MWFS | WFS | MWFS | WFS | MWFS | WFS | MWFS |
| MMPP-1 | 2.068 | 2.393 | 17.200 | 17.571 | 2.435 | 1.857 | 13.400 | 13.429 |
| MMPP-2 | 1.381 | 0.361 | 13.200 | 2.143 | 1.709 | 0.311 | 12.600 | 7.268 |
| Poisson-1 | 0.719 | 0.913 | 6.800 | 7.857 | 0.864 | 0.985 | 5.404 | 6.143 |
| Poisson-2 | 0.588 | 0.269 | 6.000 | 1.000 | 0.725 | 0.212 | 5.210 | 4.000 |
| CBR-1 | 11.464 | 12.166 | 52.800 | 54.286 | 10.935 | 11.076 | 61.638 | 61.143 |
| CBR-1 | 8.935 | 0.347 | 56.800 | 2.000 | 11.116 | 0.259 | 68.107 | 7.429 |

Fig. 3

SCHEDULING PACKET FLOWS IN MULTI-RATE WIRELESS LOCAL AREA NETWORKS

FIELD OF THE INVENTION

This invention relates generally to wireless local area networks, and more particularly to scheduling series of data packets for transmission in such networks.

BACKGROUND OF THE INVENTION

A local area network (LAN) is a communications network that spans a relatively small area. Most LANs are confined to a single building or group of buildings. However, LANs can be connected to other networks, such as the Internet, using communication channels. LANs can locally connect terminal devices such as workstations, personal computers, printers, entertainment devices, sensors, and telephones. There are many different types of LANs, Ethernet being the most common.

A wireless local area network (WLAN) is a shared-medium communication network that transmits information over wireless channels between terminals within radio transmission range. IEEE 802.11 is a communication standard for WLANs, see O'Hara et al., "IEEE 802.11 Handbook, A Designer's Companion," IEEE Press, 1999, and "IEEE 802.11 e/D5.0, Draft Supplement to Part 11: Wireless Medium Access Control (MAC) and physical layer (PHY) specifications: Medium Access Control (MAC) Enhancements for Quality of Service (QoS)." The medium access method of (MAC) of IEEE 802.11 is called a distributed coordination function (DCF), which is based on carrier sense multiple access/collision avoidance (CSMA/CA) protocol.

IEEE 802.11 wireless networks can be configured in two different modes: ad hoc and infrastructure modes. In ad hoc mode, all wireless terminals within communication range can communicate directly with each other. The present invention can be applied to Wireless LAN operating both in infrastructure mode and ad hoc mode. The IEEE 802.11a standard specifies eight transmission bit rates at 6, 9, 12, 18, 24, 36, 48, and 54 Mbps, and the 802.11b standard specifies four rate at 1, 2, 5.5, and 11 Mbps. With such a physical-layer enhancement, a terminal can select a best transmission rate depending on a quality of the wireless channel measured by the signal-to-noise ratio (SNR) or packet error rate. When used properly, a multi-rate WLAN greatly improves throughput and effectively supports communication-intensive multimedia applications.

In the context of scheduling a series of packets between terminals, i.e., a 'packet flow', the multi-rate WLAN poses new challenges for designing network protocols. Packet scheduling, particularly fair queuing, provides packet-level quality of services (QoS) in terms of throughput and delay, to enable both delay-sensitive and throughput-sensitive applications. Wireless packet scheduling should also address location-dependent channel errors in wireless networks, and shields short-term error bursts from packet flows. Location-dependent errors are a particular concern when terminals are mobile.

However, prior art wireless fair packet scheduling typically assumes a single, fixed transmission rate for all terminals, and does not consider multiple rates for different terminals, where at least one terminal is transmitting at a different rate than all other terminals. As a result, fair queuing methods that are designed for single-rate networks suffer from significant throughput reduction in VvLANs based on the 802.11a/b/g standards. In fact, even the prior art fairness notion may not be justified.

In wireless fair scheduling, packet flows, in the presence of channel errors, seek to approximate a QoS that is equivalent to idealistic, error-free channel conditions. To this end, transmissions of error-prone packet flows are deferred temporarily while error-free flows advance. This substantially improves the effective channel throughput because only flows that perceive error-free channels transmit packets at any given time.

Compared with error-free services, where all flows perceive error-free channels all of the time, error-prone flows may temporally lag behind and error-free flows lead ahead in short periods of time. However, these leading flows delay their future transmissions when the lagging flows perceive error-free channels in order to compensate for the time the lagging flows were deferred.

This way, both leading and lagging flows receive their contracted rates, i.e., throughput, over extended periods of time, and performance bounds in terms of throughput, delay and fairness are preserved over the extended periods of time in the presence of error-prone channels. In prior art design, both models of fair sharing among competing flows and compensation for error-prone flows are defined with respect to throughput. That is, 'fairness' means that over an extended period of time, all flows experience a substantial equal throughput.

Roughly speaking, each backlogged flow receives a 'fair' share of throughput, defined as $f$ bytes per second. The compensation in the presence of channel errors is also based on throughput.

If an assigned transmission rate of a packet flow $f$ is $r_f$, then the flow $f$ receives services during a time period $[t, t+\Delta T]$ in proportion to the rate $r_f$, as given by $$S_f(t, t+\Delta T) \approx \frac{r_f}{\sum_{i \in B} r_i} C\Delta T,$$

where C is a channel capacity perceived by all flows, B denotes a set of flows that are back-logged due to experiencing an error prone channel, and $\Delta T$ is some predetermined time increment.

While such a model is adequate for single-rate WLANS, that model does not work for multi-rate WLANs because the flows have different rates and there is no single channel capacity C. Instead, the channel capacity varies over time depending on the rates assigned to the various terminals. Moreover, normalizing flow throughputs in a multi-rate network leads to significant inefficiencies and mitigates the gains offered by the multi-rate physical layer, because error-prone flows consume a disproportional amount of time and channel resources.

If each terminal in a WLAN can potentially assign different transmission rates at different times, i.e., at least one terminal is transmitting at a different rate than all other terminals, then the fundamental problem is to adapt the compensation models to accommodate such multi-rate options in wireless networks.

SUMMARY OF THE INVENTION

The invention provides a multi-rate wireless fair scheduling (MWFS) method for data packets in a wireless local area network. The packet scheduler according to the invention utilizes the multi-rate capability by automatically selecting a best transmission rate to match a perceived channel quality.

A key notion of the MWFS method is to define fairness and compensation in terms of temporal shares and to ensure that backlogged packet flows receive fair shares in terms of transmission time over extended periods of time, e.g., seconds or minutes. As before, the term fairness means substantially equal, but in this case the fairness applies to time, instead of throughput, as in the prior art. The MWFS method achieves significant throughput gains by providing packet flows with dramatically different throughputs as governed by channel conditions.

The WMFS method can achieve significantly throughput gains in the order of 159% when compared to prior art fair throughput scheduling methods.

In particular, system and method schedule series of packets for transmission between terminals in a single wireless channel of a packet-switched local area network.

The local area network can operate in an ad hoc mode or in infrastructure mode. A transmission rate is assigned to each of the terminals. The terminals can be mobile.

Different terminals can be assigned different transmission rates, depending on a quality of the channel. That is, terminals transmitting via an error-free channel are assigned a higher transmission rate than terminals transmitting via an error-prone channel.

Then, the series of packets are scheduled for transmission between the terminals such that each terminal receives a substantially equal amount of transmission time over an extended period of time.

BRIEF DESCRIPTION OF THE DRAWINGS

FIG. 3 is a table of packet delay statistics in an error-free channel for different packet source using the multi-rate wireless fair scheduling according to the invention;

DETAILED DESCRIPTION OF THE PREFERRED EMBODIMENT

Figure 1A:
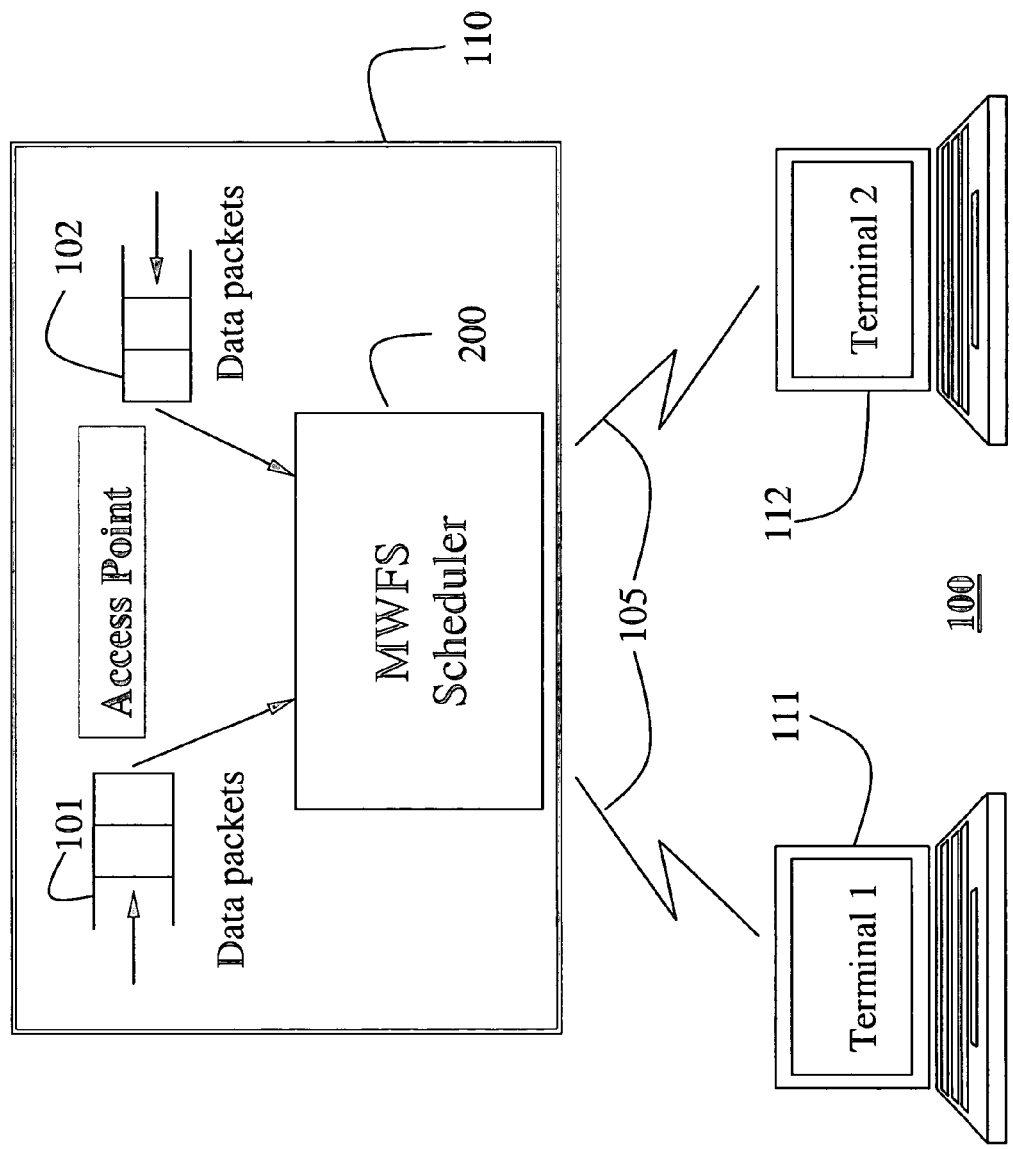
FIG. 1A is a block diagram of a communications system including a multi-rate wireless fair scheduler according to the invention.

As shown in FIG. 1A, our invention provides a system and method 200 for scheduling series of data packets 101-102, i.e., 'packet flows' in a packet-switched wireless local area network (WLAN) 100 via an access point 110. Particularly, different terminals 111-112 can communicate packets on a single physical transmission channel 105 at different assigned transmission rates. That is, at least one terminal is transmitting packets at a different transmission rate than all other terminals.

We call our scheduling method 200 multi-rate wireless fair scheduling (MWFS). Our method can be used with WLANs based on the IEEE 802.11a/b/g/e standards. In essence, the method achieves temporal fairness in the presence of location-dependent channel errors. Location-dependent errors are a particular problem when the terminals are mobile.

Figure 1B:
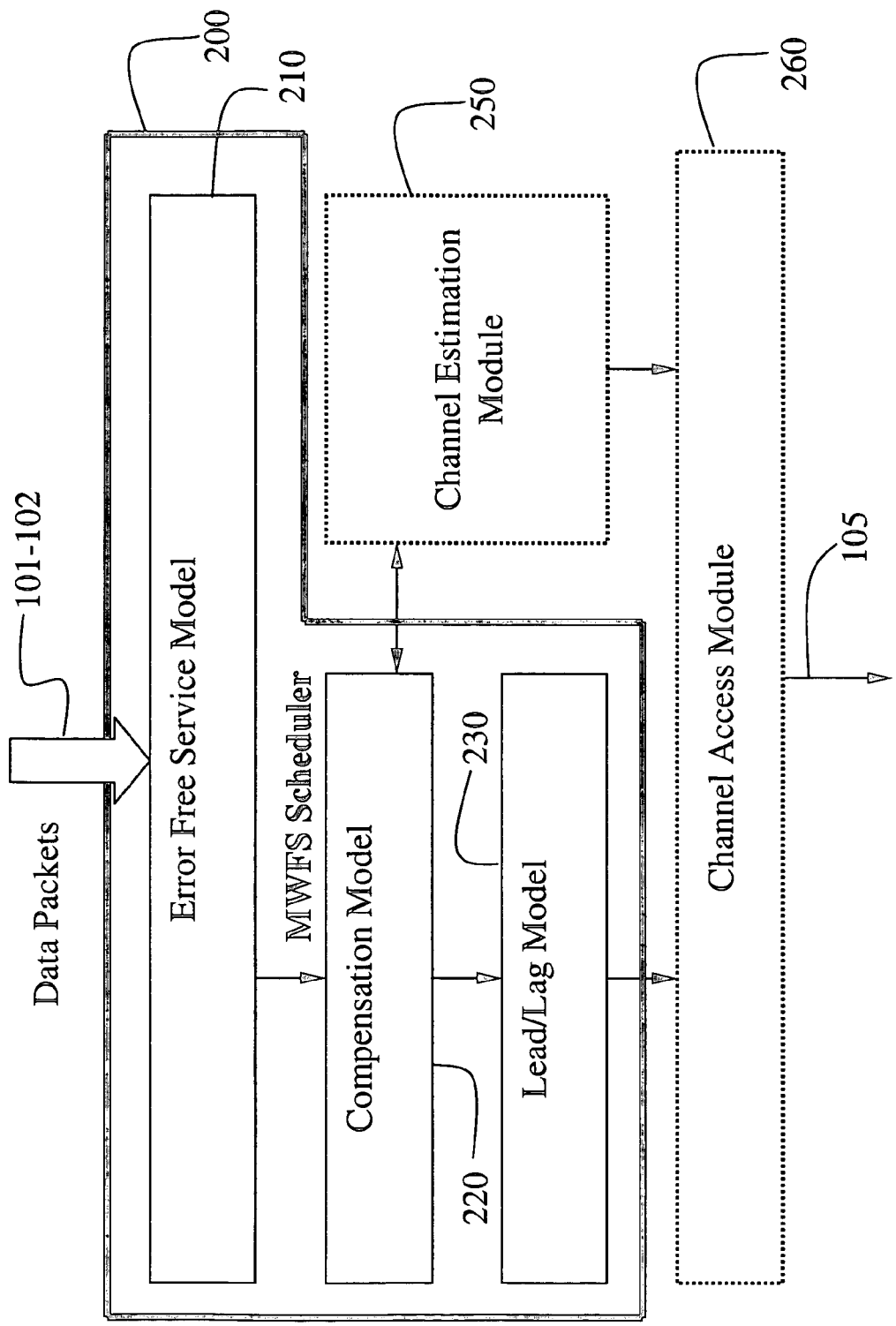
FIG. 1B is a block diagram of the multi-rate wireless fair scheduler of FIG. 1A.

As shown in FIG. 1B, the scheduler 200 uses three models, an error-free service model 210, a compensation model 220, and a lead and lag model 230. The scheduler also uses a channel estimation module 250 and a channel access module 260.

The error-free service model 210 defines ideal packet flows that transmit at different rates over an error-free channel. The compensation model 220 compensates lagging packet flows at the expense of leading flows. The lead and lag model 230 determines which packet flows are leading or lagging their error-free service, and by how much. This addresses the problem of short-term error bursts, location-dependent channel errors due to mobile terminals, and channel contention in WLANs.

The pseudo-code for the scheduler 200 is given in the Appendix.

The channel estimation model 250 determines a quality of the channel. The channel access module 260 provides access to the physical channel 105.

The method according to the invention is backward compatible with prior art wireless fair scheduling (WFS) for single rate networks, e.g., see Lu et al., "Fair scheduling in wireless packet networks," IEEE/ACM Transactions on Networking, August, 1999. If all packet flows perceive identical transmission rates, then our MWFS method degenerates to the prior art WFS because all terminals will have the same throughput.

We apply our MWFS method to WLANs based on the IEEE 802.11b/a/g/e standards. There, terminals transmitting via error-free channels can use a higher assigned transmission rate than terminals using error-prone channels.

Our distinction between fairness based on temporal share and throughput share is important in multi-rate WLANs. Our MWFS method can provide packet flows with dramatically different throughputs as governed by channel conditions. However, all packet flows receive approximately identical shares of time over long periods of time, e.g., seconds or minutes.

Network Model

In the infrastructure mode of WLANs based on the IEEE 802.11b/a/g/e standard, the access point (AP) 110 coordinates the transmissions of the data packets 101-102 for the terminals 111-112 located within the transmission range of the AP 110. A single wireless channel 105 is shared for both uplink and a downlink communications between the terminals and the AP. Terminals communicate with each other via the AP. A triplet {terminal, uplink/downlink flag, identification} designates each flow of packets.

Even though all terminals and the AP share the same channel, error rates can vary depending on the locations of the terminals with respect to the AP. Location-dependent errors are due to fading, interference, obstructions, and the like, particularly for mobile terminals.

A flow of packets is said to perceive an error-free channel when packets are transmitted successfully. Otherwise, if the packet transmission fails, then a flow is said to perceive an error-prone channel. Errors in the wireless channel typically occur in short bursts and are highly correlated in short periods of time, for example, the very small fraction of a second it takes to send a small number of packets, e.g., a dozen, but uncorrelated over extended periods of time when thousands of packets can be transmitted in a second.

We do not make any assumptions about the exact error model, though we do assume that the number of errors for a given time period $T_i$ is bounded, i.e., a packet flow i receive no more than $e_i$ packet errors in the given time period $T_i$.

Our underlying MAC protocol follows the 802.11 standard. In distributed coordination function (DCF) mode, each data packet transmission is preceded by a RTS/CTS handshake, and followed by an ACK packet. In PCF mode, each data packet transmission is preceded by a polling exchange between the AP and the terminal.

Multi-Rate Wireless Fair Scheduling

Our MWFS method departs from the prior art throughput-oriented fairness and compensation models available for single-rate networks. The MWFS uses the notion of equal temporal shares. Therefore, the MWFS method can greatly improve overall throughput.

As additional benefit, the MWFS method is backward compatible with the prior art WFS for single-rate network. If all flows perceive identical transmission rates, then MWFS method degenerates to WFS method.

Error-Free Service Model

In this section, we describe the basic scheduling model for the multi-rate wireless fair scheduling method according to the invention. For simplicity, we first consider an error-free service, i.e., a service where all of the terminals perceive an error-free channel. In subsequent sections, we describe services for error-prone channels.

Our model is an adaptation of the well known start-time fair queuing (SFQ) scheduling method, see Goyal et al., "Start-time Fair Queuing: A Scheduling Algorithm for Integrated Services Packet Switching Networks," IEEE/ACM Transactions on Networking, Vol. 5, No. 5, pp. 690-704, October 1997. In SFQ, each arriving packet is assigned two tags: a start tag and a finish tag.

Specifically, a packet with sequence number k of packet flow $f$ arriving at time $A(t_k^f)$ is assigned two tags: a start tag $S_k^f$ and a finish tag $F_k^f$, defined as follows:

$$S_k^f = \max\{V(A(t_k^f)), F_{k-1}^f\}$$

$$F_k^f = S_k^f + L_p/r_f, \quad (1)$$

where $L_p$ denotes a size of the packet in bits, $V(\cdot)$ is a virtual time for the start tag of the packet currently being served in the scheduler, and a base transmission rate of a flow $f$ is $r_f$. Then, SFQ selects the packet flow with the minimum start tag and transmits its head-of-line (HoL) packet, i.e., the very next packet to be transmitted.

The invention adapts SFQ to the multi-rate WLAN. For a packet flow $f$ a current transmission rate at time t is $C_f(t)$. This current rate can be normalized with respect to the base transmission rate $r_f$. Therefore, the tagging as modified according to the invention is:

$$S_k^f = \max\{V(A(t_k^f)), F_{k-1}^f\}$$

$$F_k^f = S_k^f + L_p/(r_f \cdot C_f(t)), \quad (2)$$

where $C_f$ is the current transmission rate, and the other variables are as defined for equation (1).

Therefore, both the start and the finish tags are normalized with respect to a current assigned transmission rate. This enables a high-rate packet flow, which perceives an error-free channel, to transmit at a higher transmission rate.

In addition, the method provides temporal fairness for each flow that is lagging. After tags are assigned to each packet, the scheduling allows the flow $f_{min}$ with a smallest start tag to transmit first. The pseudo code of the above MWFS tagging is given in the function enqueue( ) of the Appendix.

Lead/Lag Model

The lead and lag model specifies how much compensation is needed for a lagging packet flow at the cost of a leading flow. In our MWFS method, the compensation is defined in terms of time units to ensure our fair temporal compensation. Each flow $f$ has an associated credit counter $E_f(t)$ to indicate a status of a current flow, e.g., $E_f(t)>0$ indicates that the flow $f$ is leading, and a credit counter $E_f(t)<0$ indicates that the flow is lagging. If $E_f(t)=0$, then the flow is 'on' schedule.

When a flow is experiencing an error-prone channel, the flow relinquishes time units to other flows so that the flow becomes a lagging flow, and the other flows become leading flows. Later, when the lagging flow again experiences an error-free channel, the leading flows, in turn, relinquish time units back to the lagging flow to get it back on schedule.

Our design is based on two principles. First, we increment the credit counter for a leading flow only when the time units given up by a lagging flow g are used by a leading flow l. While at the same time, the credit counter of the lagging flow is decremented by the same amount. Second, the time units of the credit counter are expressed in terms of transmitted bytes, normalized with respect to the transmission rate of the packet flow. That is, the incrementing can be expressed by $E_l(t)=E_l(t)+L_g/C_l(t)$, where $L_g$ is a size of the packet transmitted by the leading packet flow, and $C_l(t)$ is a current transmission rate of transmission of the leading flow.

In essence, the lead and lag model specifies the temporal share, i.e., how many time units, a leading flow gives up in the future, and how many time units a lagging flow receives in compensation for having been deferred.

Compensation Model

Two additional issues need to be addressed. First, the scheduler needs to determine whether a leading flow is allowed to transmit a data packet or whether the current scheduling opportunity should be relinquished for compensation for a deferred lagging flow. Second, the scheduler needs to determine which lagging flow is allowed to transmit in the case the current scheduling opportunity has been relinquished by a leading flow and there are multiple lagging flows.

We use a graceful service relinquishing model for compensating lagging flows. Consider a leading packet flow i with a base transmission rate of $r_f$, a credit counter $E(i)$, and a maximum lead of $E_{max}(i)$. In other words, the flow with the largest lead is selected to relinquish time units to a lagging flow. This flow i is portioned hierarchically into a compensation flow $i^c$ and a transmission flow $i^t$, with respective transmission rates of $r_i \cdot E(i)E_{max}(i)$, and $r_i \cdot (1-E(i)/E_{max}(i))$.

When the packet flow i is allocated a transmission opportunity, the flow i hierarchically schedules the opportunity among compensation flow $i^c$ and transmission flow $i^t$. All time units belonging to the compensation flow $i^c$ are relinquished to a lagging flow selected as described below. Note that as the lead decreases, the transmission rate for compensation flow $i^c$ decreases linearly. This has the property of a graceful degradation of service for the leading flow.

After the leading flow gives up the transmission opportunity for its head-of-line packet, we need to select a lagging flow for transmission in the given time unit. If the packet size is $L_l$, and the transmission rate of the leading flow is $C_l(t)$, then the available time for compensation is $\Delta T_l = L_l/C_l(t)$.

In a multi-rate network, the manner in which the lagging flow is selected to fill the time unit $\Delta T_l$ presents a new problem. In the WFS method for the single-rate network, a fixed time unit and identical packet size are assumed for all flows. Therefore, any lagging flow can be selected to transmit in the relinquished unit by the leading flow.

In the multi-rate case, this is not true anymore. In fact, the transmission of the head-of-line packet from the selected lagging flow can only be a portion of the available time unit $\Delta T_l$, or can far exceed the length of the time unit $\Delta T_l$. Moreover, the simple weighted round robin (WRR) based compensation used by the WFS method is not applicable for the multi-rate network because the weights may not be whole integers.

Our compensation model preserves the feature of graceful compensation among lagging flows even when there are different transmission rates and arbitrary sized packet.

If the credit counter of a lagging flow i is $E_i(t)$, then we normalize the credit counter for all lagging flows according to $g_i(t)=E_i(t)/\Sigma_{j\in F(t)}E_j(t)$, where F(t) denotes all lagging flows at time t.

Each lagging flow receives compensation, in terms of time units, in proportion to $g_i(t)$. This can be implemented with the following operations.

The head-of-line packet from the lagging flow g is assigned a compensation tag $L_g/C_g(t)\cdot g_g(t)$, given that $L_g$ is the size of the head-of-the-line packet, and $C_g(t)$ is the current transmission rate.

Then, the lagging flow with the smallest compensation tag is selected to receive the relinquished compensation time unit. That is, our compensation model allocates compensation time units fairly, i.e., substantially equal, among all lagging flows.

Implementation

There are a number of implementation issues of our MWFS method for IEEE 802.11 MAC networks.

Channel State Estimation and Propagation

Because a receiving terminal has the most accurate information on the packet error rate, we estimate 250 a channel state, i.e., error-free or error-prone, in the receiving terminal. For a terminal that is not the intended recipient at a given instant in time, we can use the RTS/CTS handshake in the DCF mode or the polling message in the PCF mode to estimate channel states, see Bianchi, "Performance analysis of the IEEE 802.11 media access protocol for wireless LANs," Proceedings of ACM SIGCOMM '94, 1994. After estimating the channel state, the terminal can send the channel state to the AP as part of polling packets. The AP can then use the polling state to schedule packets appropriately.

Handling Uplink Flows

Our MWFS method works for both downlink and uplink flows. For uplink flows, the AP periodically polls each terminal to collect the following information: the size of the HoL packet, and the arrival time of the HoL packet if the packet flow lags again after an idle period.

The AP can acquire the transmission rate from each terminal. The details for this can be as described for ARF, Kamerman et al. "WaveLAN II: A high-performance wireless LAN for the unlicensed band," Bell Labs Technical Journal, pp. 118-133, Summer 1997, or refined RBAR, see Holland et al., "A rate-adaptive MAC protocol for multi-hop wireless networks," Proceedings of ACM MOBICOM'01, 2001, or OAR, see Sadeghi et al., "OAR: A Multi-rate Media Access Protocol for Wireless Ad Hoc Networks," ACM Mobile Networking and Applications, 2003.

Evaluation

In this section, we describe simulation results to evaluate the performance of the MWFS method under various conditions. The reference prior art WFS method is the one described by Holland et al. That method utilizes a modified fluid fair algorithm that provides throughput fairness and throughput delay bounds for packet flows for both error-free and error-prone channels.

The simulation setting is as follows. Four types of traffics are sources, Poisson sources and Markov-modulated Poisson Process (MMPP) sources.

The transmission rates are 2 Mbps, 5.5 Mbps and 11 Mbps according to the IEEE 802.11b standard. The packet size for each flow can vary. We use the well known two-state discrete Markov Chain to simulate channel errors, and the parameters $p_g$ and $p_e$ represent probabilities that the next time unit will experience an error-free channel, or an error-prone channel, respectively.

Therefore, the steady-state probabilities of the error-free channel $P_G$ and the error-prone channel $P_E$ are given by $P_G=p_g(p_g+p_e)$ and $P_E=p_e/(p_g+p_e)$, respectively. We use a one-step prediction to estimate the channel state in the immediate future based on the current state of the channel. This exploits the reality that the channel errors are highly correlated over short periods of time, e.g., fractions of seconds. Each simulation run lasts for 100,000 time units, unless otherwise explicitly stated, and the results are averaged over 50 simulation runs.

Throughput in Error-Free Channels

In this set of simulations, we consider six FTP flows in an error-free channel to demonstrate that the throughput improvement of our MWFS method over the prior art WFS method. Each flow uses a 2 Mbps transmission rate as a comparison base. Then, we adapt our simulations for a multi-rate network, in which flows FTP-1 and FTP-2 transmit at 11 Mbps, flows FTP-3 and FTP-4 use 5.5 Mbps, and flows FTP-5 and FTP-6 use 2 Mbps. We also vary the packet size set for each flow for different simulations.

Figure 2:
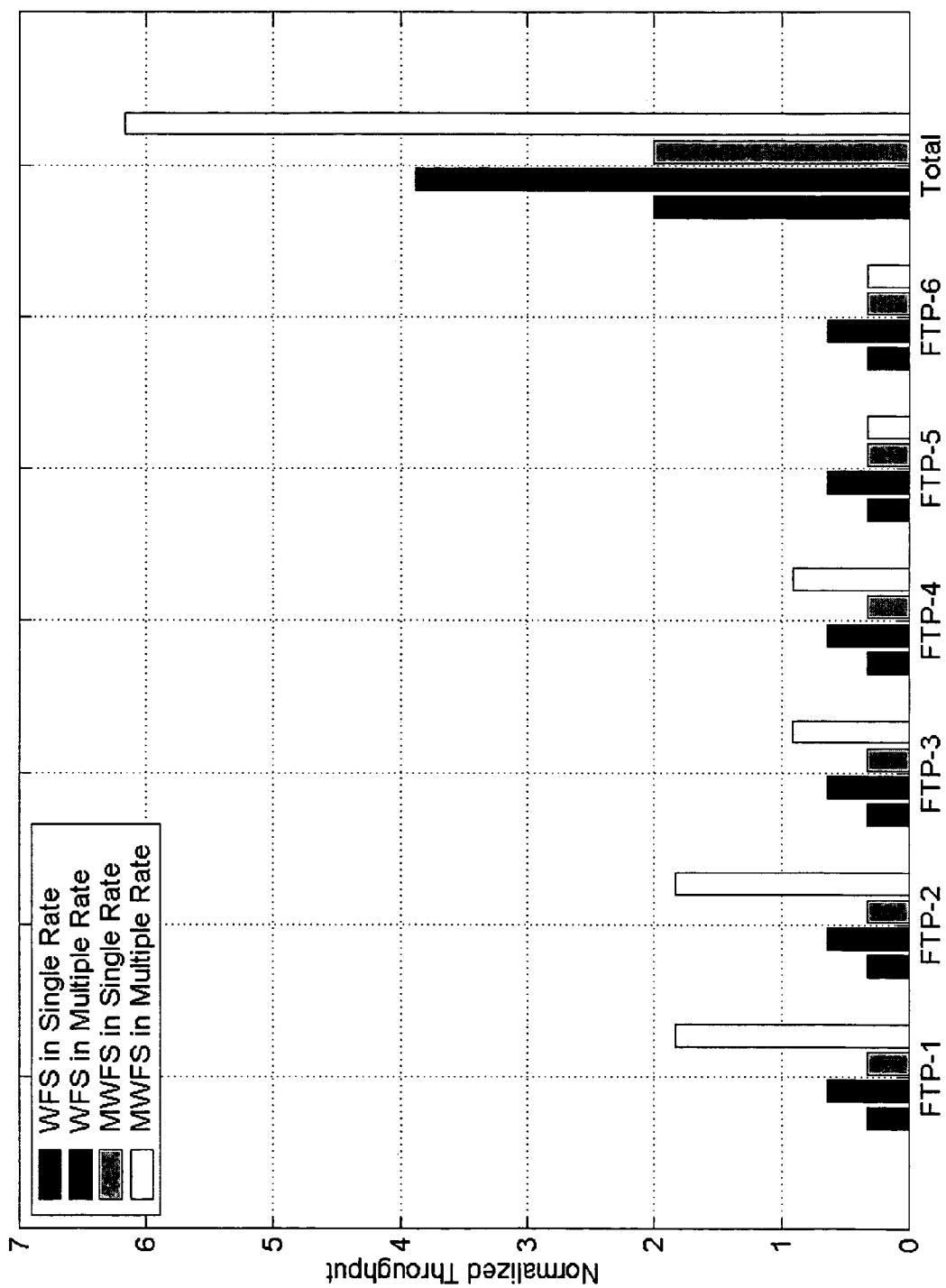
FIG. 2 is a graph comparing throughput in an error-free channel for prior art single rate fair scheduling and multi-rate wireless fair scheduling according to the invention.

FIG. 2 shows the per-flow throughput, as well as the overall throughput. It shows that our MWFS method achieves an aggregate throughput of 159% when compared with the prior art WFS method in the multi-rate wireless network. The throughput is similar to WFS when all packet flows use the same transmission rate. Significant throughput improvement is also achieved on a per-flow basis, particularly for flows that use higher transmission rates. For example, throughput increases by 550% for flows FTP-1 and FTPO-2, and increases by 270% for flows FTO-3 and FTP-4 comparing with the case where each flow uses the base transmission rate of 2 Mbps.

Our MWFS allocates time periods 'fairly' among all packet flows, such that a high-rate packet flow is not penalized in the presence of low-rate packet flows. The prior art would have to give lower rate flows longer periods of time to achieve equal throughput, thus, severely degrading the performance of high-rate packet flows. Our MWFS method attains a significant increased throughput for both overall packet flow and on a per-flows basis.

Delay in Error-Free Channels

We further describe packet-delay performance of the MWFS method under error-free channel conditions. The arrival processes of the six flows or 'sources' are as follows: two MMPP flows, in which the modulated process is a continuous Markov chain with two states ON and OFF. The transition probability from the ON to OFF is 0.9, and the probability from state OFF to On is 0.1. Packets arrive according to a Poisson process at rate of 3.0. There are also two Poisson flows with packet arrival rate at 2.0. The remaining two flows are CBR sources with a packet generated every 1 ms. To measure the delay performance of the MWFS method with respect to different flows, we let flows MMPP-1, Poisson-1, CBR-1 transmit at the base transmission rate 2 Mbps and other flows transmit at 11 Mbps. The metrics used in the evaluation include an average delay $Delay^{avg}$ of successfully transmitted packets, a maximum delay $Delay^{max}$, a standard delay deviation $Delay^{dev}$, and an average buffer size $Buffer^{avg}$ for each flow.

FIG. 3 shows the results of this simulation. The delay experienced by the 11 Mbps flows is less than the 2 Mbps for both methods. However, our MWFS method achieves substantially smaller delay time and a smaller buffer size for high-rate flows compared with the prior art WFS method. With the MWFS method, delays experienced by high-rate flows do not affect lower-rate flows. This demonstrates the capability of the MWFS method to provide differentiated services for high-rate and low-rate flows.

Throughput in Error-Prone Channels

In this simulation, we describe the effectiveness of the compensation model of the MWFS method for an error-prone channel. Ideally, the MWFS method preserves temporal fairness to achieve higher throughput and ensures a graceful compensation for lagging flows. For simplicity of presentation, we consider a scenario with four FTP flows. Two flows (FTP-3,4) use a base transmission rate of 2.0 Mbps and the other two flows (FTP-1,2) transmit at a higher rate of 11 Mbps. The channel error patterns of these flows are location-dependent and modeled by a two-state discrete Markov chain. By setting $p_e+p_g=0.1$, we emulate highly correlated channel conditions for each flow.

Figure 4:
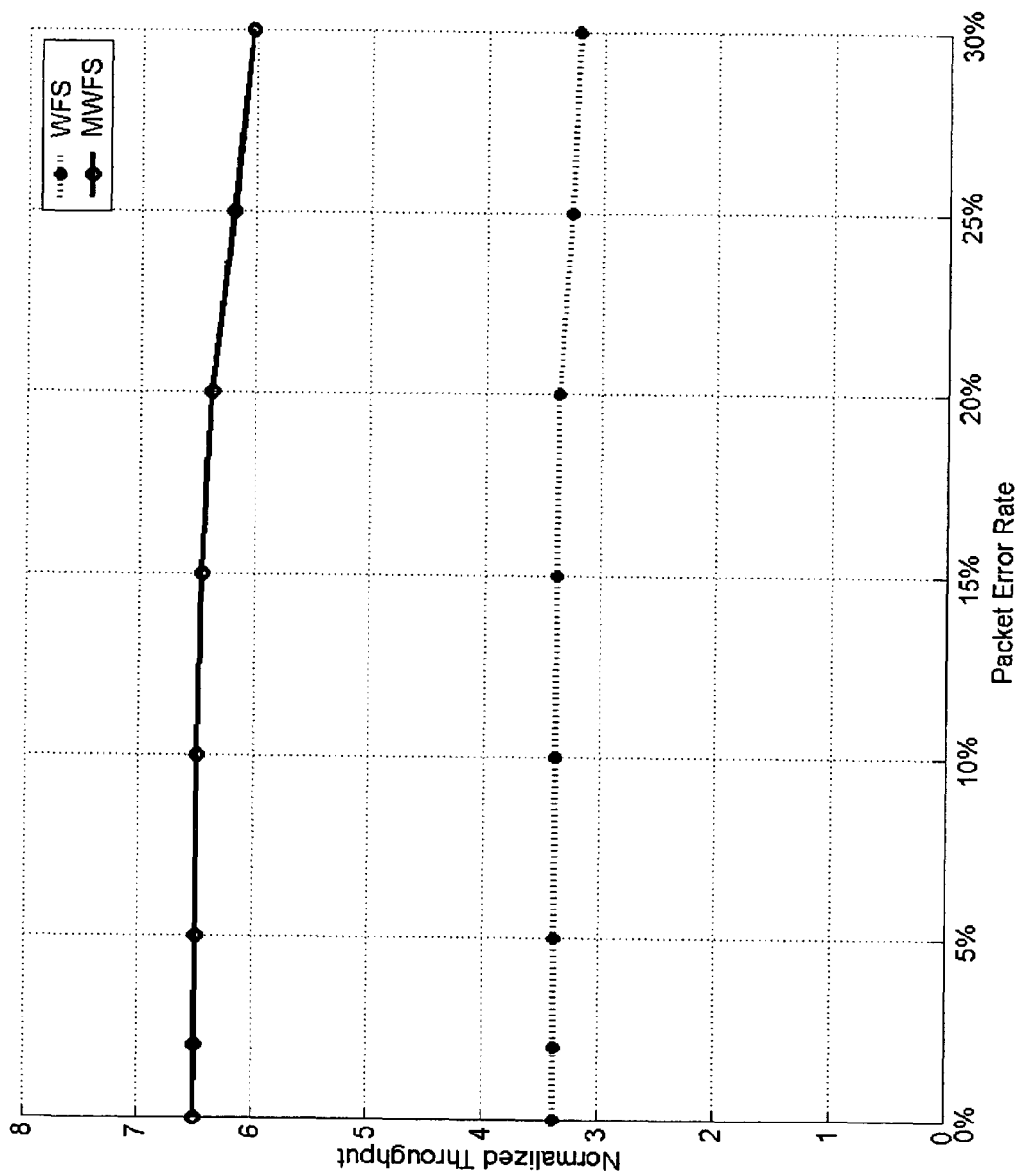
FIG. 4 is a graph comparing throughput in an error-prone channel for the prior art single rate fair scheduling and the multi-rate wireless fair scheduling according to the invention.

FIG. 4 shows the throughput results for the prior art WFS and the MWFS method according to the invention, where packet error rate varies from 0% up to 30%. As the packet error rate increases to 20%, the throughputs for both scheduling methods decreases because the probability that all flows are simultaneously error-prone increases. However, the overall throughput of the MWFS method is substantially better than the WFS method.

Figure 5:
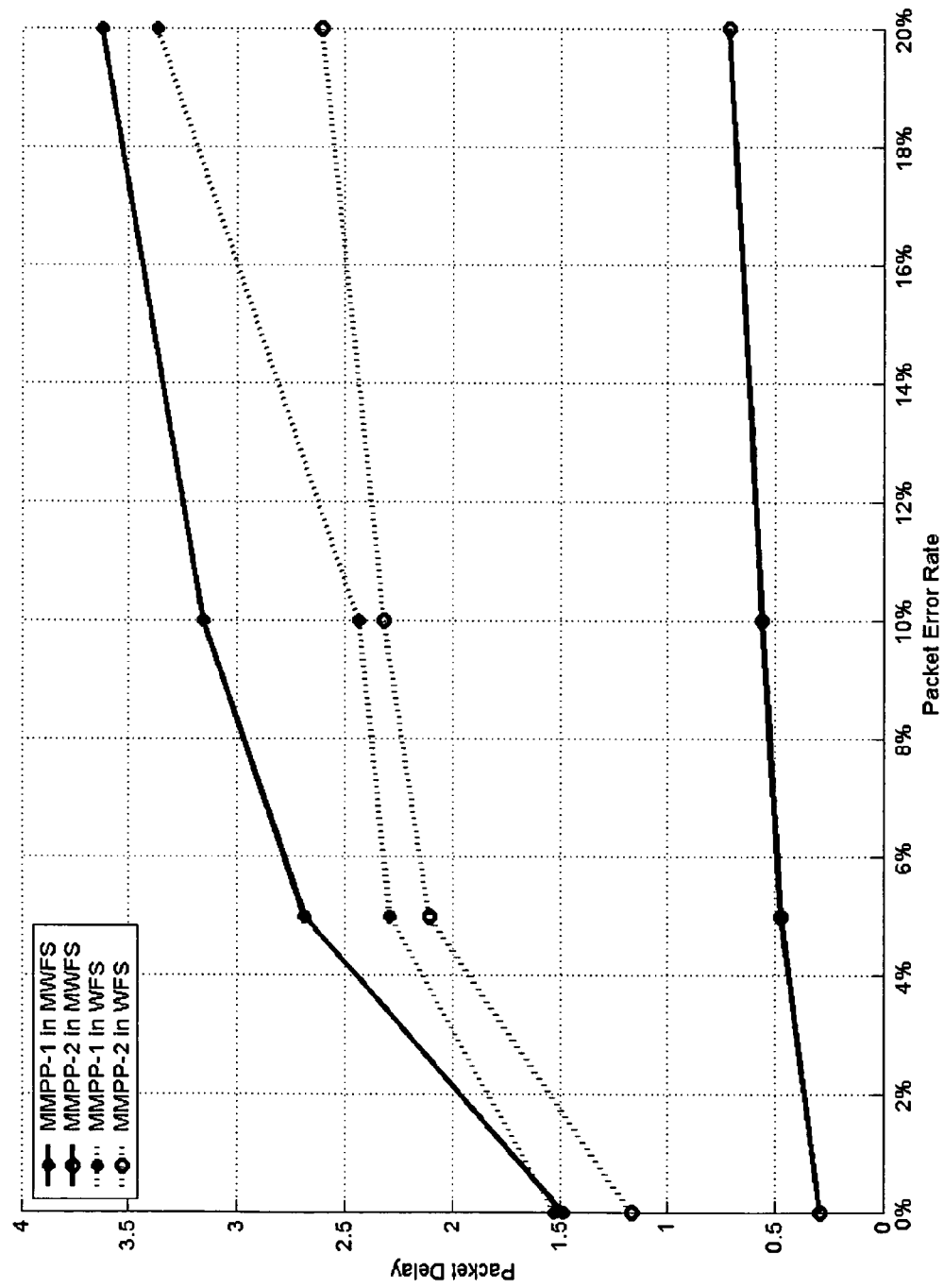
FIG. 5 is a graph comparing packet delay for MMPP sources for the prior art single rate fair scheduling and the multi-rate wireless fair scheduling according to the invention.

FIG. 5 shows the temporal fairness and effectiveness of our compensation model. There, we measure normalized time periods acquired by each flow. When the channel is error-free, each flow obtains a substantially equal amount of time 1.0. As the packet error rate increases, the length of the time periods obtained by flows decrease, which subsequently leads to an overall throughput reduction, as shown in FIG. 4. However, the long-term temporal shares of all flows are still preserved, and are substantially equal for all packet flows. This shows that our compensation model is effective. Even when packet error rate increases to 20%, the throughput and time share gained by each flow reduce only slightly. This demonstrates that the MWFS method is still able to shield errors from flows and maintain a good overall throughput.

Packet Delay in Error-Prone Channel

We further describe the impact of an error-prone channel on packet delay. In this simulation setting, flows 1 and 2 are MMPP sources with packets arriving at the rate 1.0, and flows 3 and 4 are Poisson sources with packet arrival rate of 0.5. We also use two CBR flows with rate 1.0 to emulate the background traffic. The transmission rates for MMPP-1, Poisson-1 and CBR-1 are set as 2 Mbps, and the other three flows use a transmission rate of 11 Mbps.

Figure 6:
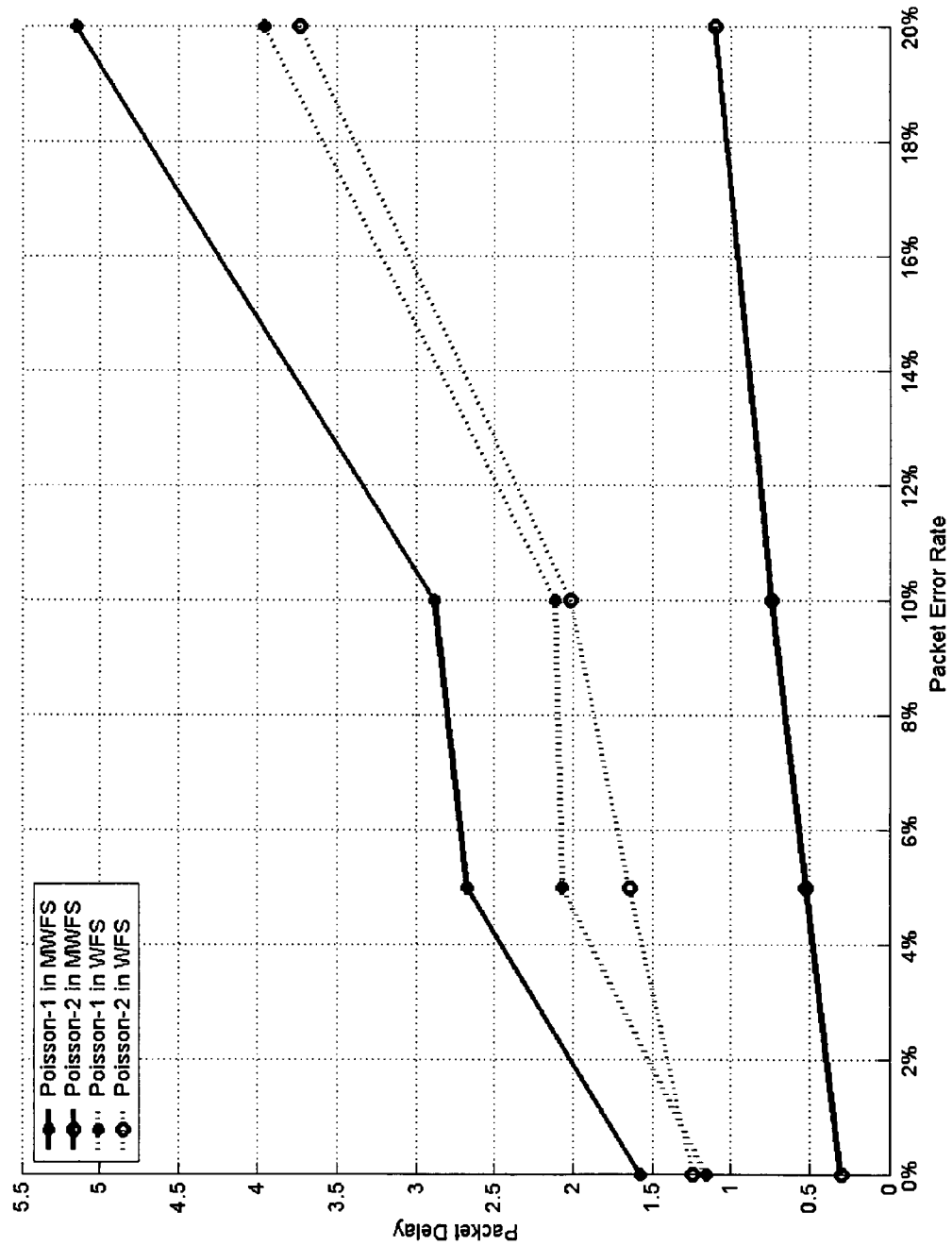
FIG. 6 is a graph comparing packet delay for Poisson sources for the prior art single rate fair scheduling and the multi-rate wireless fair scheduling according to the invention.

FIGS. 5 and 6 show the packet delays for the MMPP and Poisson flows, respectively. These Figures show that the delay experienced by each flow increases as the channel error rate increases. Because the WFS method maintains throughput fairness, the delays experienced by high-rate flows and low-rate flows are approximately the same. However, delay performance is different for low- and high-rate flows in the MWFS, because a temporal fair share is used. Specifically, high-rate flows, MMPP-2 and Poisson-2, experience notice-ably less delay than the comparable low-rate flows. However, low-rate flows have a delay performance comparable to the WFS. This shows that the MWFS method is able to provide a certain degree of flow separation among high-rate and low-rate flows, such that high-rate flows are not penalized, or worse yet, paralyzed by low-rate packet flows.

Effect of the Invention

The invention provides a packet scheduling method that utilizes the physical-layer multi-rate capability for WLANs based on the IEEE 802.11 standard. The models used by the method ensure fair temporal shares for all terminals over extended periods of time. By taking advantage of error-free channels, the method achieves significant throughput gains when compared to prior art schedulers. Although the method is designed for packet-switched WLAN based on IEEE 802.11b/a/g networks operating in infrastructure mode, the method can also be used the IEEE 802.11 e framework by integrating the scheduler into a hybrid coordinator usually collocated with the AP. The method is independent of the processes used to estimate the channel estimation and transmission rates.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

```
ON PACKET P ARRIVING queue_i OF source_i
1    enqueue(p, queue_i):
2    /* Â is set of active traffic sources */
3    if i ∈ Â
4        Â = Â - {i};
5        start_tag_i = virtual_time;
6        finish_tag_i = start_tag_i
7                    + sum_{i∈Â} (r_i)/(r_i + size(p)/speed_i;
8        credit_i = 0:
EXTRACTING PACKET FOR TRANSMITTING
1    l = min_{start_tag_k} (k ∈ Â);
2    If credit_i <= O /* handling non-leading flows */
3        If (l can send)
4            PKT_SEND(l, l)
5        else
6            /* I cannot send due to channel error */
7            /* find flow with smallest start_tag to substitute i */
8            g = min_{start_tag_k} (k ∈ Â, k_can_send)
9            if (g exists)
10               /* transmit for g, update tags,credit for both */
11               PKT_SEND(g, l):
12           else /* All sources are in channel error */
13               IDLE;
14   else /* handling leading flows */
15       /* decide whether let leading flow transmit or compensate */
16       flag = compensation_flag(l): /* 1: compensate, 0: normal */
17       g = min_{comp_tag} (k|k ∈ A, credit_k < O, k_can_send);
18       If (l_can_send)and((!flag)or((flag)and(g !exists))
19           PKT_SEND(l, l):
20       else If (g exists)
21           PKT_SEND(g, l);
22       else /* All sources are in channel error */
23           IDLE;
24       /* check if some flow becomes inactive */
25       /* adjust other flows in Â accordingly */
26       HANDLE_IDLE_FLOW;
PKT_SEND(g, l)
/* send packet from source_i, update tags, credits for both */
1    p_l = dequeue(l);
2    /* update start and finish tag only for l */
3    start_tag_l = max(virtual_time, finish_tag_l);
4    finish_tag_l = start_tag_l + sum_{i∈Â} (r_i)/r_l * size(p_g)/speed_l:
5    If (l ≠ g )
6        credit_l+ = size(p_g)/speed_l;
```

APPENDIX-continued

```
7       credit_g- = size(p_g)/speed_l;
8       comp_tag_l = -size(p_g)/speed_l * credit_l);
9       comp_tag_g = -size(p_g)/speed_g * credit_g);
HANDLE_IDLE_FLOW(j, i)
/* adjust flows credit counters once some flow becomes inactive */
1       Â = Â - {i}
2       If ∃i.s.t.empty(queue_i)
3           for (k ∈ Â)
4               credit_k = credit_k + credit_i * r_i/sum_{k∈Â}(r_j);
```

We claim:

1. A method for scheduling a plurality of series of packets for transmission between a plurality of terminals in a single wireless channel of a packet-switched local area network, comprising:

assigning a transmission rate to each of a plurality of terminals;

assigning a start tag $S_k^f = \max\{V(A(t_k^f)), F_{k-1}^{f}\}$ and a finish tag $F_k^f = S_k^f + L_p/(r_f \cdot C_f(t))$ to each packet, where k is a sequence number of the packet, in a particular series of packets $f$, $A(t_k^f)$ is an arrival time of the packet, $L_p$ is a size of the packet in bits, $V(\cdot)$ is a virtual time for the start tag, $r_f$ is a base transmission rate, and $C_f(t)$ is a current transmission rate; and scheduling the series of packets for transmission between the terminals such that each terminal receives a substantially equal amount of transmission time over an extended period of time.

2. The method of claim 1, in which the local area network operate in an ad hoc mode.

3. The method of claim 1, in which the local area network operates is in an infrastructure mode.

4. The method of claim 1, further comprising:
assigning different transmission rates to the plurality of terminals such that at least one terminal is transmitting at a different rate than all other terminals.

5. The method of claim 1, in which some of the plurality of terminals are mobile.

6. The method of claim 1, in which the assigned transmission rate is dependent on a quality of the channel.

7. The method of claim 6, in which a particular terminal transmitting via an error-free channels is assigned a higher transmission rate than another terminal transmitting via an error-prone channel.

8. The method of claim 1, further comprising:
normalizing the current transmission rate with respect to the base transmission rate.

9. The method of claim 1, further comprising:
scheduling the particular packet with a smallest start tag to transmit first.

10. The method of claim 1, further comprising:
associating a credit counter $E_f(t)$ with each series of packets $f$ such that when $E_{f(t)} > 0$ the series of packets is leading, and when $E_{f(t)} < 0$ the series of packets is lagging, where t is a time unit.

11. The method of claim 10, further comprising:
incrementing the credit counter for a particular leading series of packets by a number of time units relinquished by a particular lagging series of packets while decrementing the credit counter of the particular lagging series of packets by the number of time units.

12. The method of claim 11, in which the time units are expressed in terms of transmitted bytes, normalized with respect to the transmission rate.

13. The method of claim 11, further comprising:
relinquishing time units from a selected leading series of packets having a maximum credit counter to lagging series of packets.

14. The method of claim 13, in which the time units are relinquished to the lagging series of packets proportional to normalized credit counters of the lagging series of packets.

15. The method of claim 1, further comprising:
estimating a state of the channel in each terminal to determine whether the terminal schedules packets for transmission.

16. The method of claim 1, in which scheduling mechanism is implemented with a hybrid coordinator according to an IEEE 802.11e standard.

17. A system for scheduling a plurality of series of packets for transmission between a plurality of terminals in a single wireless channel of a packet-switched local area network, comprising:

an error-free service model configured to define ideal packet flows that transmit at different rates over an error-free channel;

a lead and lag model configured to determine leading packet flows and lagging packet flows, and to determine amounts of leading and amounts of lagging for the leading packet flows and the lagging packet flows, respectively; and a compensation model configured to compensate the lagging packet flows at an expense of the leading packet flows; and means for scheduling the series of packets for transmission between the terminals such that each terminal receives a substantially equal amount of transmission time over an extended period of time.

18. The system of claim 17, further comprising:
a channel estimation module; and
a channel access module.

19. A system for scheduling a plurality of series of packets for transmission between a plurality of terminals in a single wireless channel of a packet-switched local area network, comprising:

means for assigning a transmission rate to each of a plurality of terminals;

means for assigning a start tag $S_k^f = \max\{V(A(t_k^f)), F_{k-1}^{f}\}$ and a finish tag $F_k^f = S_k^f + L_p/(r_f \cdot C_f(t))$ to each packet, where k is a sequence number of the packet, in a particular series of packets $f$, $A(t_k^f)$ is an arrival time of the packet, $L_p$ is a size of the packet in bits, $V(\cdot)$ is a virtual time for the start tag, $r_f$ is a base transmission rate, and $C_f(t)$ is a current transmission rate; and means for scheduling the series of packets for transmission between the terminals such that each terminal receives a substantially equal amount of transmission time over an extended period of time.

\* \* \* \* \*